(12) United States Patent
Agarwal et al.

(10) Patent No.: US 12,166,925 B2
(45) Date of Patent: *Dec. 10, 2024

(54) CALL CONTEXT TRANSFER FROM ONE CALL CENTER SYSTEM TO OTHER CALL CENTER SYSTEM(S)

(71) Applicant: Microsoft Technology Licensing, LLC, Redmond, WA (US)

(72) Inventors: Shiva Agarwal, Sammamish, WA (US); Alexander Adam Fennell, Philadelphia, PA (US); Anabela da Silva Carvalho Heliszkowski, Kirkland, WA (US); Hayley Kara Howell, Los Altos, CA (US); Peter Burr Nilsson, Mercer Island, WA (US); Puneet Singh Sohi, Renton, WA (US); Daniel Blaine Thorington, Tacoma, WA (US); Stephanie Ann English, Woodinville, WA (US); Sathak Abdul Hameed Sathakathulla, Bellevue, WA (US); Abhas Brahma, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,209

(22) Filed: Jun. 19, 2023

(65) Prior Publication Data
US 2024/0163375 A1 May 16, 2024

Related U.S. Application Data

(63) Continuation of application No. 17/529,796, filed on Nov. 18, 2021, now Pat. No. 11,792,328.

(51) Int. Cl.
*H04M 3/58* (2006.01)
*H04M 3/51* (2006.01)

(52) U.S. Cl.
CPC ............... *H04M 3/58* (2013.01); *H04M 3/51* (2013.01)

(58) Field of Classification Search
CPC .................................. H04M 3/58; H04M 3/05
See application file for complete search history.

(56) References Cited

U.S. PATENT DOCUMENTS 8,976,942 B2 * 3/2015 Bushey ............... H04M 3/5166
379/265.11
9,210,274 B2 * 12/2015 Simoes ................ H04M 15/06
(Continued)

*Primary Examiner* — Akelaw Teshale
(74) *Attorney, Agent, or Firm* — Weaver IP L.L.C.

(57) ABSTRACT

Methods, systems, apparatuses, and computer-readable storage mediums described herein are configured to transfer call context between different call center systems. For example, a first call center system that establishes a communication session between a user and an agent of the first system provides context determined during the session to a call context service. The service stores the context and provides it to other requesting call center systems. For instance, during a call transfer to an agent of a second system, the first system requests the service to provide a transfer number of the second system to which the user is to be transferred. The service determines the transfer number and provides it to the first system. The first system performs the call transfer using the number. After the transfer is complete, the second system provides a request for the context, and the service provides the context to the second system.

20 Claims, 6 Drawing Sheets

(56) References Cited

U.S. PATENT DOCUMENTS

| | | | |
|---|---|---|---|
| 2009/0175437 A1* | 7/2009 | Strandberg | H04M 3/5237 |
| | | | 379/265.09 |
| 2012/0148040 A1* | 6/2012 | Desai | C23C 16/50 |
| | | | 379/265.13 |
| 2013/0034025 A1* | 2/2013 | Simoes | H04M 15/06 |
| | | | 379/142.04 |
| 2013/0163746 A1* | 6/2013 | Wick | H04M 3/5166 |
| | | | 379/265.14 |
| 2016/0301758 A1* | 10/2016 | Said | H04L 67/142 |
| 2022/0029932 A1* | 1/2022 | Pattyreddy | G06N 20/00 |

* cited by examiner

CALL CONTEXT TRANSFER FROM ONE CALL CENTER SYSTEM TO OTHER CALL CENTER SYSTEM(S)

CROSS-REFERENCE TO RELATED APPLICATION(S)

The instant application is a Continuation of, and claims priority to, U.S. patent application Ser. No. 17/529,796, entitled "CALL CONTEXT TRANSFER FROM ONE CALL CENTER SYSTEM TO OTHER CALL CENTER SYSTEM(S)," and filed on Nov. 18, 2021, the entirety of which is incorporated by reference herein.

BACKGROUND

As voice networks expand their call context capabilities, transferring calls from one platform to another (including the legacy public switched telephone network (PSTN)) is becoming an essential part of business. For example, if an inbound call for customer support starts on a PTSN network, and then gets transferred to one call center platform, and then to another call center platform, the agent that ultimately receives the call would need to have the full lifecycle of the call to better assist the customer. This is possible in closed systems that utilize the same call center platform, but has not been completely successful when passing calls between different call center platforms. One technique to transfer context is to write call context data into Session Initiation Protocol (SIP) User-to-User Information (UUI) headers. However, there is no guarantee that this context makes it from one platform to another due to varying interpretations and implementations of the SIP standard. Moreover, the data that is transmitted via SIP headers is generally in an unencrypted, cleartext format and is limited to only 128 characters.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are configured to transfer call context between different call center systems. For example, a first call center system that establishes a communication session between a user (e.g., a customer) and an agent of the first call center system may provide call context determined during the communication session to a call context service. The call context service stores the call context and provides the call context to other requesting call center systems. For instance, during a call transfer to an agent of a second call center system, the first call center system may request the call context service to provide a transfer phone number of the second call center to which the user is to be transferred. The call context service determines the transfer phone number and provides the transfer phone number to the first call center system. The first call center system performs the call transfer using the transfer phone number. When communication is established between the user and an agent of the second call center system, the second call center system provides a request for the call context determined for the communication session between the user and the agent of the first call center system. In response, the call context service provides the call context to the second call center system.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
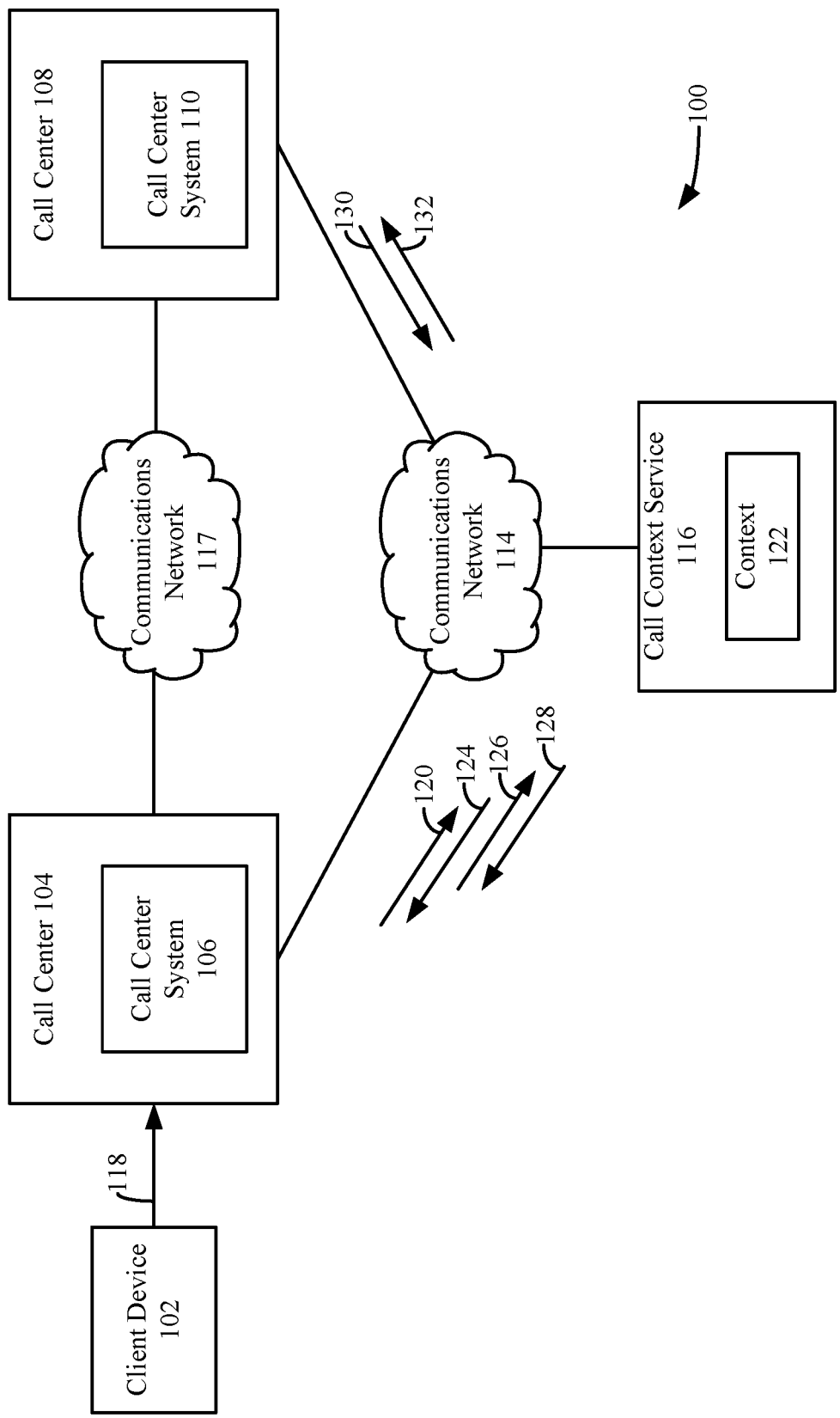
FIG. 1 shows a block diagram of an example system configured to provide context determined for a communication session to different call centers in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, terms such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Embodiments described herein are directed to transferring call context between different call center systems. For example, a first call center system that establishes a communication session between a user (e.g., a customer) and an agent of the first call center system may provide call context determined during the communication session to a call context service. The call context service stores the call context and provides the call context to other requesting call center systems. For instance, during a call transfer to an agent of a second call center system, the first call center system may request the call context service to provide a transfer phone number of the second call center to which the user is to be transferred. The call context service determines the transfer phone number and provides the transfer phone number to the first call center system. The first call center system performs the call transfer using the transfer phone number. When communication is established between the user and an agent of the second call center system, the second call center system provides a request for the call context determined for the communication session between the user and the agent of the first call center system. In response, the call context service provides the call context to the second call center system.

The techniques described herein advantageously enable call context to be shared throughout the overall ecosystem of different call center systems, regardless of whether such systems operate in accordance with different standards or protocols. From the customer perspective, the customer does not need to repeat any information which has been shared in prior legs of the call, as such information may be provided to other call center systems to which the user has been transferred in its entirety.

Moreover, the techniques described herein also improve the functioning of computing devices on which call center systems execute. For instance, as described herein, the call context service determines the transfer phone number of a call center system to which a user is to be transferred. The foregoing may be achieved by maintaining a plurality of Dialed Number Identification Service (DNIS) pools, each comprising phone numbers associated with a particular call center system, at the call context service. By offloading the DNIS pools to the call context service, call center systems no longer have to expend compute resources (e.g., processing cycles, memory, storage, input/output (I/O) transactions, power, etc.) to maintain such pools and query such DNIS pools to determine a target phone number.

Still further, the techniques described herein also improve the functioning of computing device(s) on which the call context service executes. As described herein, the call context service generates a unique transaction identifier that is associated with all legs of a communication session between a customer and the various call center systems to which the customer is transferred. The unique transaction identifier is associated with the call context that is obtained for each leg and may be utilized to search for the call context. Thus, the tracking identifier may be utilized track the life cycle of a phone call from beginning to end. A requesting party may issue a query to the call context service comprising the unique tracking identifier. The call context service may retrieve the call context associated with the tracking identifier and provide the retrieved information to the requesting party. Using this information, one may be able to easily determine what time a call started, what time a call was transferred, which call centers handled which portion of the phone call, etc., via a simple query comprising a single search term (i.e., the unique tracking identifier), which results in a compute efficient execution of the query to retrieve the call context that minimizes the compute resources required to execute the query.

FIG. 1 shows a block diagram of an example system 100 configured to provide context determine for a communication session to different call centers, according to an example embodiment. As shown in FIG. 1, system 100 includes a client device 102, a first call center 104, a second call center 108, and a call context service 116. Call context service 116 is communicatively coupled to first call center 104 and second call center 108 via a communications network 114. Communications network 114 may comprise one or more networks such as local area networks (LANs), wide area networks (WANs), enterprise networks, the Internet, etc., and may include one or more of wired and/or wireless portions. First call center 104 and second call center 108 are communicatively coupled via communications network 117. Communications network 117 may comprise one or more networks, such as, but not limited to, a landline network (e.g., a public switched telephone network (PSTN), a cellular or mobile network, and/or any network that enables communication with a client device (e.g., client device 102) via a telephone number assigned thereto. Examples of client device 102, includes, but is not limited to a telephone or a smart phone communicatively coupled to communications network 114 and/or communications network 117. Client device 102 may be configured to initiate or receive a telephone call to and/or from call center 104 via different telephony protocols, including, but not limited to, PSTN, a cellular or mobile network, or Voice over Internet Protocol (IP). It is noted that while FIG. 1 shows two call centers (e.g., first call center 104 and second call center 108), system 100 may comprise any number of call center systems that are communicatively coupled to call context service 116.

Each of first call center 104 and second call center 108 represent a centralized office that facilitates a large volume of communications with various endpoints, such as client device 102. For example, each of first call center 104 and second call center 108 may handle telephone calls for a telemarketing company, a debt collection company, a customer support department of a company, a tech support department of a company, or any other suitable function for any other suitable entity. Each of first call center 104 and second call center 108 may comprise a private branch eXchange (PBX) telephone system that accommodates multiple incoming phone calls to a common phone number that are routed to different telephone devices utilized by agents (e.g., automated agents or human agents) of the respective call center. For instance, each of first call center 104 and second call center 108 may comprise switching logic configured to receive incoming phone calls and route the calls to a telephone device of a particular agent.

In an embodiment, the PBX may be implemented as a Voice over Internet Protocol (VoIP)-based PBX. In accordance with such an embodiment, each of first call center system 106 and second call center system 110 is configured to receive telephony services via a VoIP connection. The VoIP connection may be implemented, for example, over a broadband data service such as Digital Subscriber Line (DSL), Integrated Services Digital Network (IDSN), data over cable, T1/T3, optical carrier, carrier-class Ethernet, satellite or any other suitable data service. The various physical transport media used for implementing such data services are well known.

First call center 104 may comprise a first call center system 106, and second call center 108 may comprise a second call center system 110. Each of first call center system 106 and second call center system 110 may also be referred to as a call center platform. First call center system 106 may comprise one or more software applications executed on one more computing devices (e.g., servers), and second call center system 106 may comprise software application(s) executed on other computing device(s). Each of first call center system 106 and second call center system 110 may be published and/or developed by a different publisher and/or developer. Accordingly, each of first call center system 106 and second call center system 110 operate independently from one another and may operate in accordance with different communication protocols, data formats, functionality, and/or features. Examples of call center system platforms 106 and 110 include, but are not limited to, Genesys® Cloud by Genesys® Telecommunications Laboratories, Inc. of Daly City California, Twilio® Flex by Twilio® of San Francisco, RingCentral® Contact Center by RingCentral® of Belmont, California, Five9® by Five9®, Inc. of San Ramon, CA, etc.

Examples of functions and features that may be provided by a particular call center system may include, but are not limited to, interactive voice responses (IVR), skill-based call routing, voicemail or external routing to another call center, omni-channel support, customer relationship management (CRM) integration, reporting and analytics, call recording, supervisor tools, etc. IVR provides automated responses to inbound callers. These responses could include an acknowledgement of the call, an estimated wait time (e.g., via text-to-speech (TTS)), a prompt menu, etc. Each of first call center system 106 and second call center system 110 may provide a respective customized prompt menu for routing calls, as it allows the caller to narrow down the department in advance of being connected. Skill-based call routing auto-routes calls based on the quickest available agent. The dialed number, caller details (e.g., the number that they are calling from), and responses provided by the call through IVR can be used to assign the call to a relevant agent. Omni-channel support enables the management of website inquiries, live chat, email, social media, and phone calls in a single place (e.g., via a single graphical user interface (GUI)). This allows an agent to a see a customer's history with the company associated with the call center. CRM integration integrates CRM software with the call center system to assist with predictive and automated dialing, using a data set already gathered for a particular customer. Reporting and analytics refers to the ability to records metrics associated with calls, analyzing them, and creating reports. Some things that may be tracked include, but are not limited to, average call length, first call resolution rate, agent idle time, agent utilization rate, call transfer rate, average customer queue time, call abandonment rate, cost per contact, etc.

Each of call center systems 106 and 110 may be associated with a plurality of applications (e.g., software applications), where the application enables the agent to perform a particular function for the user or playback prompts in a particular language. For instance, one or more of call center systems 106 and 110 may provide a device activation application that enables an agent to activate a device purchased by the user, a tech support application that assists an agent to troubleshoot an issue being experienced by the user with respect to a particular product, etc. Each of call center systems 106 and 110 may also provide an application for certain features and functions described above, such as, but not limited to, IVR, CRM, reporting and analytics, call recording, supervisor tools, etc.

Each of call center systems 106 and 110 may be associated with a respective identifier that uniquely identifies the call center system. Similarly, each of the applications associated with call center systems 106 and 110 may be associated with a respective application identifier that uniquely identifies the application within a respective call center system. For instance, a device activation application of call center system 108 may be associated with a first set of phone numbers, a tech support application of call center system 108 may be associated with a second set of phone numbers, a device activation application of call center system 110 may be associated with a third set of phone numbers, a tech support application of call center system 110 may be associated with a fourth set of phone numbers, etc.

Call context service 116 is configured to maintain call context of a communication session between a particular user (e.g., a customer) and an agent of one call center (e.g., call center 106) and transfer that context to one or more other call centers (e.g., call center 108) when the user is transferred to such call centers This enables the downstream call center (e.g., call center system 110) to operate more efficiently, as the downstream call center system will have the necessary information (e.g., language preference, product information, serial number information, etc.) that was already provided by the user during his or her conversation and/or with the agent of call center 104. Call context service 116, first call center system 106 and second call center system 110 may be configured to implement a request-response protocol in which request messages are transmitted thereby and messages responsive to the request messages are received. In accordance with an embodiment, each of call context service 116, first call center system 106 and second call center system 110 are configured to transmit hypertext transfer protocol (HTTP) or HTTP secure (HTTPS) requests and receive HTTP or HTTPS responses. Call context service 116 may be configured to execute on one or more server computers or computing devices, which may include one or more distributed or "cloud-based" servers of a cloud-based service platform. An example of a cloud-based service platform includes, but is not limited to, Microsoft® Azure® from Microsoft Corporation of Redmond, WA. An example of maintaining and transferring call context is described as follows.

Either an agent of a call center (e.g., call center 104) may initiate a communication session with a user (e.g., a customer), or a user may initiate a communication session with the call center. In the example shown in FIG. 1, a user initiates a communication session 118 with call center 104 (e.g., a telephone call that is inbound to call center 104) by entering a telephone number associated with call center 104 via client device 102. Responsive to receiving the telephone call, call center system 106 may perform one of many different actions. For instance, call center system 104 may accept the telephone call, generate a request 120, and send request 120 to call context service 116 via communications network 114. Request 120 may indicate that a communication session between the user and call center 104 has initiated. In accordance with an embodiment, the request is an HTTPS POST request.

The request may comprise various call context, including, but not limited to, the phone number associated with the user, a language preference of the user, the phone number associated with call center 104 that received the incoming phone call, an identifier of call center system 106 that uniquely identifies call center system 106 from among a plurality of different call center systems, a start time that indicates a time at which the call was received, a call type identifier that identifies whether the phone call was an incoming phone call or an outgoing phone call, and an event type identifier that identifies the event that caused the request to be sent. Examples of event types include, but are not limited to, a call started event that indicates that a call between a customer and an agent has been initiated, a call transfer event that indicates that the call is to be transferred to another call center, a hang up event that indicates that the call has been terminated, and a log event that is utilized for reporting various information to call context service 116. In the example described with reference to FIG. 1, request 120 would comprise a call type identifier that indicates that the phone call is an incoming phone call and would comprise an event type identifier indicating a call started event.

Responsive to receiving request 120, call context service 116 may generate a record of communication session 118 and store the context (shown as context 122) within the record. The record may be included in a database (e.g., a Structured Query Language (SQL)-based database) maintained by and/or accessible by call context service 116. The record may comprise a plurality of fields, each corresponding to one or more different types of context data described herein. Responsive to receiving request 120, call context service 116 may generate a unique tracking identifier, which uniquely identifies communication session 118 from among a plurality of different communication sessions tracked by call context service 116. Call context service 116 generates and provides a response 124 comprising the generated tracking identifier to call center system 106 via communications network 114. In accordance with an embodiment, request 124 is an HTTPS response. As will be described herein, the tracking identifier may be utilized to track the life cycle of a phone call from beginning to end. For instance, a requesting entity (e.g., an administrator) of any of call center system 104, call center system 108, and/or call context service 116 may issue a query to call context service 116 that comprises the tracking identifier. Call context service 116 may retrieve information (e.g., context 122) associated with the tracking identifier and provide the retrieved information to the requesting party. Using this information, one may be able to easily determine what time a call started, what time a call was transferred, which call centers handled which portion of the phone call, etc., via a simple query comprising a single search term (i.e., the unique tracking identifier). Historical call transcripts (e.g., transcripts of previous calls between a particular consumer and call center system) may also be retrieved via such information. This way, any downstream agent could see what transpired between the customer and a prior call center system to flesh out the overall context of the call thus far. In addition, in the event that call center system 106 makes a request for context 122, call center system 106 may provide a request comprising a single query term (i.e., the unique tracking identifier), which results in a compute efficient execution of the query to retrieve context 122.

Call center system 106 may initiate an IVR-based application that enables the user to interact with the call center system 106 via a telephone keypad or by speech recognition. In accordance with an embodiment, the IVR-based application generates request 120. The IVR-based application may respond with pre-recorded or dynamically generated audio (e.g., a message or prompt) to further direct the user on how to proceed. The input or information provided by the user (e.g., responses provided by the user either via a keypad of client device 102 and/or voice) may be recorded by the IVR-based application. Based on the responses provided by the user, the IVR-based application may route the user to an appropriate destination. The destination may be another agent (either an automated agent or a human agent) of call center system 106 that can better assist the user, an agent associated with a different call center (e.g., call center 108), and/or another automated system for further processing. For instance, the user may indicate that the he or she needs assistance with product activation via the IVR-based application. Product activation may be handled by agents located at call center 108. In accordance with such an example, call center system 106 may initiate a transfer to call center system 110 of call center 108. To perform the transfer, call center system 106 requires a phone number associated with call center system 110 to which the call is to be transferred. The phone number may be obtained from call context service 116.

For instance, call center system 106 may provide a request 126 to call context service 116 via communications network 114. Request 126 may comprise the context information provided via request 120, along with an application identifier of call center system 106 of the application handling the call between client device 102 and call center system 106 and/or initiated the call transfer, a timestamp indicating the time at which the transfer was requested, an event type identifier that identifies the event is a call transfer, a target call center system identifier of the target call center system (i.e., call center system 110), a target application identifier of a target application of the target call center system that is to handle the transferred call, a partial or complete transcript of the call between the customer and the agent of call center system 106, any information provided by the customer that was record by call center system 106 during the call with the agent of call center system 106 (e.g., name, address, account information, etc.), etc. In accordance with an embodiment, request 126 is an HTTPS POST request. It is noted that the information (e.g., the transcript) included in request 126 may comprise a large number of characters (i.e., greater than 128 characters), thereby providing a large amount of context to call context service 116. Conventional techniques for transferring context to other call centers utilize SIP-based messaging schemes (e.g., SIP UUI headers), which disadvantageously utilize an unencrypted, cleartext format when transferring data and limit the amount of characters that may be transmitted to 128 characters.

Call context service 116 maintains the phone numbers for each application of call center system 110 (and other call center systems). For instance, call context service 116 may maintain a data structure (e.g., a queue) for each application of each call center system registered with call context service 116. Each data structure comprises a plurality of phone numbers (also referred to as a Dialed Number Identification Service (DNIS) pool) associated with the corresponding application of an associated call center system. Each of such numbers, when dialed, connects the user to an agent of a particular department or application. In an embodiment in which the data structures are queues, the phone number located at the beginning of the queue represents the next available phone number.

Responsive to receiving a request having an event type identifier of call transfer (e.g., request 126), call context service 116 updates the record previously generated for the phone call to include the context newly-provided via request 126 and also utilizes the target call center system identifier and/or target application identifier to determine the phone number to which the call is to be transferred. For instance, call context service 116 determines the data structure from which a transfer phone number is to be determined using the target call center system identifier and/or target application identifier. Upon determining the data structure, call context service 116 retrieves the next available phone number from the data structure. Call context service 116 generates a response 128 including the target phone number and provides response 128 to call center system 106 via communications network 114. In accordance with an embodiment, response 128 is an HTTPS response.

Upon receiving response 128, call center system 106 initiates a transfer to call center system 110 using the target phone number included in response 128. For instance, call center system 106 may perform a takeback and transfer (TNT) (also known as transfer connect). In accordance with a TNT operation, call center system 106 may playback a dual tone multi frequency (DTMF) tone sequence. These tones act as a signal mechanism to communications network 117 (e.g., a PTSN) requesting a transfer to be completed. The DTMF sequence may comprise a particular character sequence (e.g., "8", "*2") followed by the target phone number. Upon detection of the DTMF sequence, communications network 117 drops the call with call center system 106, re-routes the caller to call center system 110 by dialing the target phone number, and establishes a communication session with call center system 110 via communications network 117.

Call center system 110 is configured to request context 122 obtained from call center system 106 from call context service 122. For instance, call center system 110 may issue a request 130 for context 122 to context service 116 via communications network 114. Request 130 may comprise the phone number associated with the user (e.g., the phone number associated with client device 102) and the phone number of call center system 110 to which the user is transferred, which are provided to call center system 110 during the TNT process. In accordance with an embodiment, request 130 is an HTTPS GET request.

Call context service 116 utilizes the phone number associated with the user and the phone number of call center system 106 included in request 130 and retrieves context 122 from the record associated with the phone numbers. It is noted that call context service 116 may also be configured to utilize other information (or keys) to retrieve context 122 from the record. Context 122 may comprise some or all the context information received via request 126, including, but not limited to, the phone number associated with the user, a language preference of the user, the phone number associated with call center system 104 that received the incoming phone call, an identifier of call center system 106 that uniquely identifies call center system 106 from among a plurality of different call center systems, a start time that indicates a time at which the call was received, a call type identifier that identifies whether the phone call was an incoming phone call or an outgoing phone call, an application identifier of call center system 106 of the application handling the call between client device 102 and call center system 106 and/or initiated the call transfer, a timestamp indicating the time at which the transfer was requested, the target application identifier of the target application of the call center system 110, a partial or complete transcript of the call between the customer and the agent of call center system 106, any information provided by the customer that was record by call center system 106 during the call with the agent of call center system 106 (e.g., name, address, account information, etc.), etc.

Call context service 116 generates a response 132 comprising the context and provides response 132 to call center system via communications network 114. Call context service 116 also provides the unique tracking identifier (that was generated and provided to call center system 106 via response 124) to call center system 110 via response 132. In accordance with an embodiment, the unique tracking identifier is included as part of context 122. In the event that call center system 110 makes subsequent requests for context 122, call center system may provide a request comprising the tracking identifier rather than the phone numbers, and call context service 116 may locate the record comprising the context using the tracking identifier. Querying context via a single query term (i.e., the tracking identifier) is more compute efficient than utilizing a plurality of different query terms (i.e., the phone number associated with the user and the phone number of call center system 110 to which the user is transferred) to locate the same data.

Call center system 110 may comprise a user interface (e.g., a GUI) that displays the call context information to an agent of call center 108 to which the user is now connected. This way, the agent may be able to quickly reference the information that was already provided by the user during his or her conversation with the agent of call center 104, and the user will not be required to re-provide the information that was already provided.

It is noted that while the foregoing describes a PTSN-based transfer between different call centers, the embodiments described herein are not so limited. For instance, a call center-to-call center transfer may also be performed in accordance with the SIP protocol. In accordance with such an embodiment, when performing a call transfer, call center system 106 may provide a SIP transfer request (e.g., a REFER request) to call center system 110. In the SIP transfer request, call center system 106 may include the tracking identifier (received from call context service 116) into a SIP header (e.g., a UUI header) of the SIP transfer request. Call center system 110 may obtain the tracking identifier from the transfer request. To obtain call context 122 from call context service 116, call center system 110 may provide a request (e.g., request 130) comprising the tracking identifier via communications network 114. Call context service 116 receives the request and utilizes the tracking identifier included therein to lookup and retrieve call context 122. Call context service 116 provides call context 122 to call center 110 via a response (e.g., response 132). In accordance with such an embodiment, certain customer information (e.g., the customer's name) remains private during the transfer, as only the tracking identifier is passed from call center system 106 to call center system 110, and from call center system 110 to call context service 116.

It is further noted that while the foregoing describes that call center system 106 obtains a transfer number from call context service 116 via DNIS pools, the embodiments described herein are not so limited. For instance, call center system 106 may maintain a pre-determined call transfer number of another call center system to which a call is to be transferred (e.g., call center system 110). In accordance with such an embodiment, call center system 106 is configured to request the tracking identifier associated with the call from call context service 116 and provides the tracking identifier to the other call center system. In addition, call center system 106 may utilize the tracking identifier when providing call context to call context service 116. For instance, call center system 106 may associate the tracking identifier with the call context when providing the call context to call context service 116. Call context service 116 may locate the record associated with the call using the tracking identifier and update the record with the received call context.

Figure 2:
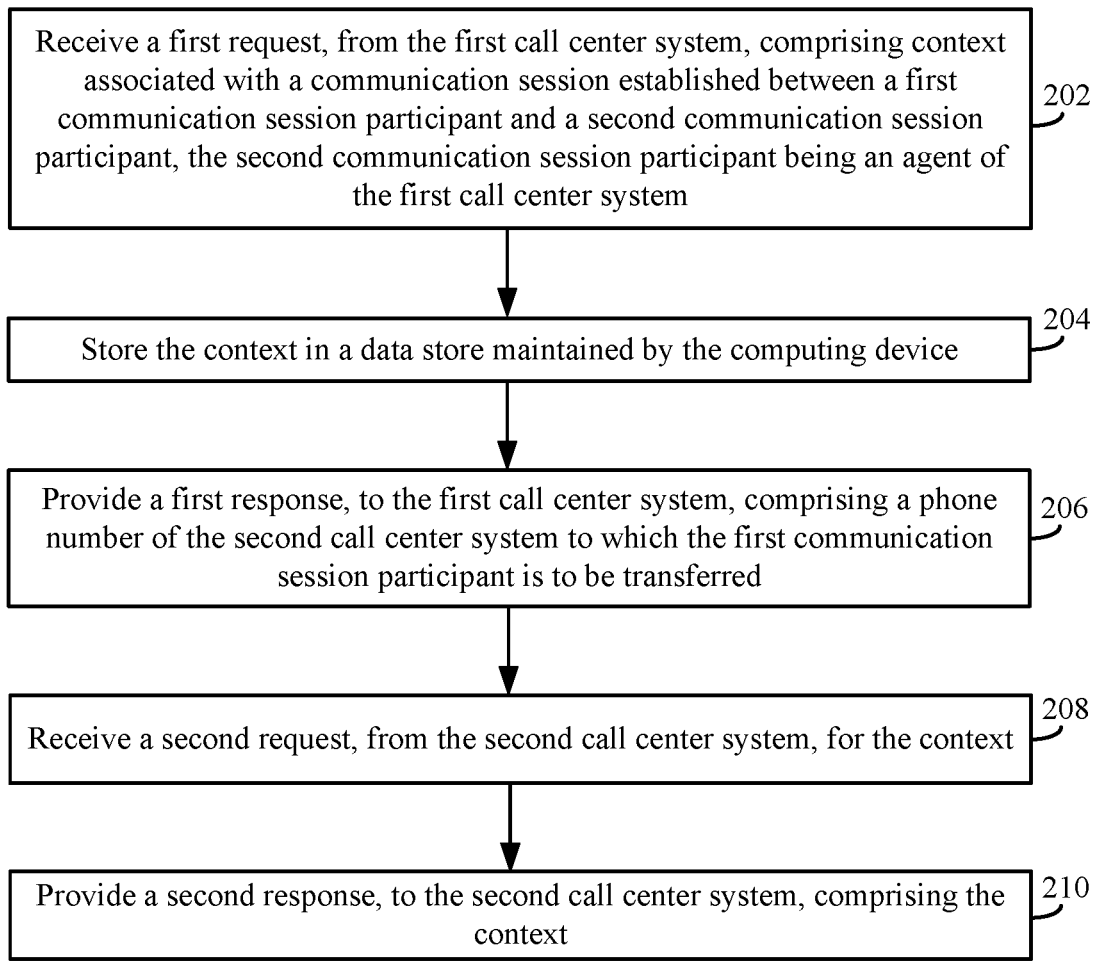
FIG. 2 shows a flowchart of a method for providing call context obtained from a first call center to a second call center in accordance with an example embodiment.
Figure 3:
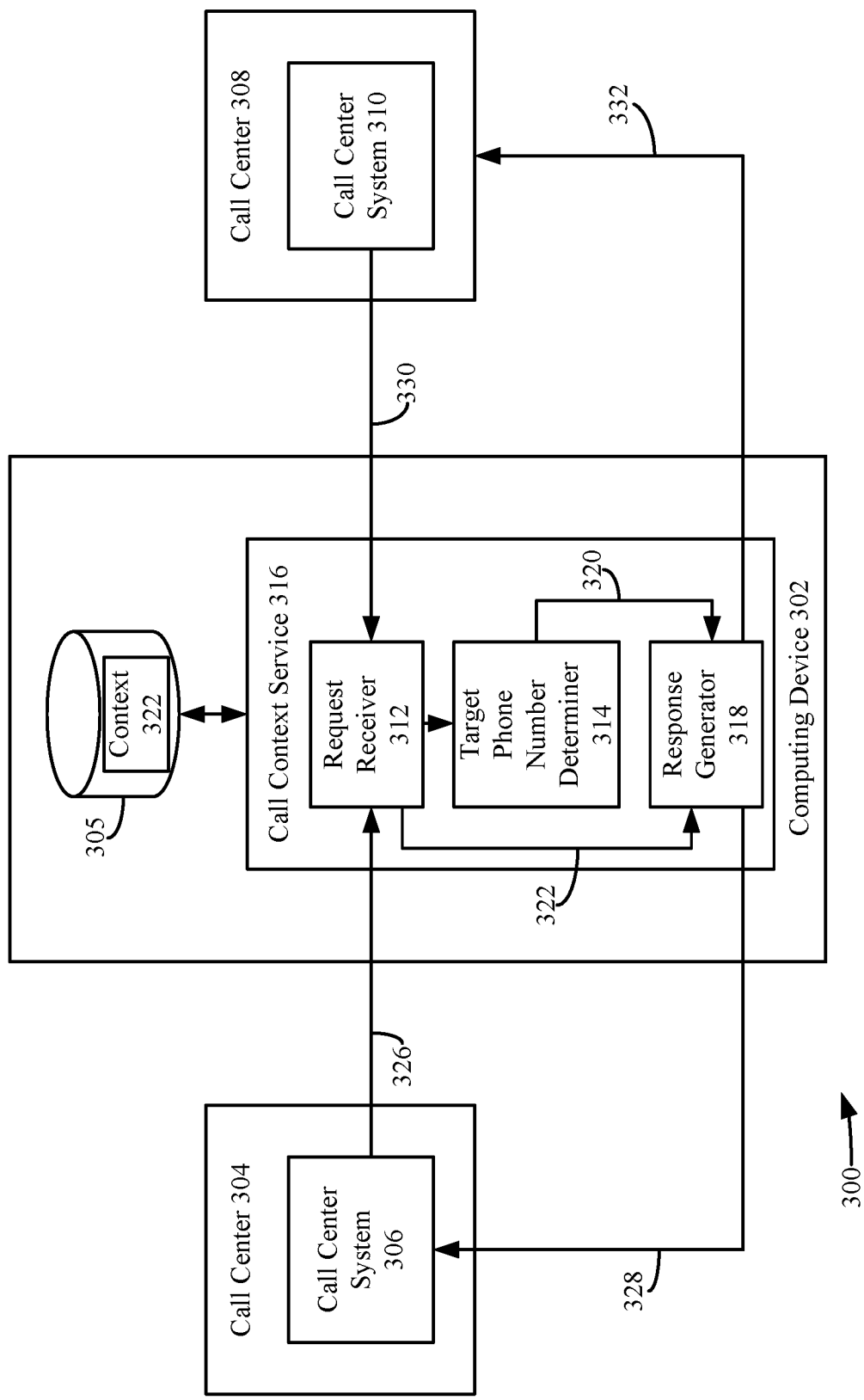
FIG. 3 depicts a block diagram of a system for providing call context obtained from a first call center to a second call center in accordance with an example embodiment.

Accordingly, call context may be shared between and provided to different call centers in many ways. For example, FIG. 2 shows a flowchart 200 of a method for providing call context obtained from a first call center to a second call center in accordance with an example embodiment. In an embodiment, flowchart 200 may be implemented by a system 300 of FIG. 3. Accordingly, flowchart 200 will be described with reference to FIG. 3. FIG. 3 depicts a block diagram of a system 300 for providing call context obtained from a first call center to a second call center in accordance with an example embodiment. As shown in FIG. 3, system 300 comprises a computing device 302, a first call center 304, and a second call center 308. First call center 304 and second call center 308 are examples of first call center 104 and second call center 108, as described respectively above with reference to FIG. 1. First call center 304 comprises a first call center system 306, and second call center 308 comprises a second call center system 310. First call center system 306 and second call center system 310 are examples of first call center system 106 and second call center system 110, as respectively described above with reference to FIG. 1. Computing device 302 is configured to execute a call context service 316, which is an example of call context service 116, as described above with reference to FIG. 1. Call context service 316 may comprise a request receiver 311, a target phone number determiner 314, and a response generator 318. Computing device 302 may comprise one or more server computers or computing devices, which may include one or more distributed or "cloud-based" servers or nodes of a cloud-based service platform. First call center 304 and second call center 308 are communicatively coupled via a network, such as communications network 117, as described above with reference to FIG. 1. Each of first call center 304 and second call center 308 are communicatively coupled to computing device 302 via a network, such as communications network 114, as described above with reference to FIG. 1. As further shown in FIG. 3, computing device 302 comprises a data store 305. Data store 305 may be a stand-alone storage system, and/or may be internally or externally associated with call context service 316. In embodiments, data store 305 may be communicatively coupled to other systems and/or devices via one or more networks, such as networks 114 and 117 (as shown in FIG. 1). That is, data store 305 may be any type of storage device or array of devices, and while shown as being communicatively coupled to call context service 316, may be networked storage that is accessible via network(s). Data store 305 may be configured to store one or more databases or data sets against which queries for call context (e.g., context 322) maintained thereby may be executed. In accordance with an embodiment, data store 305 may comprise a non-volatile memory (e.g., non-volatile random access memory (NVRAM), hard disks, optical discs, solid-state drives, etc. Other structural and operational embodiments will be apparent to persons skilled in the relevant art(s) based on the discussion regarding flowchart 200 and system 300 of FIG. 3.

Flowchart 200 begins with step 202. In step 202, a first request, from the first call center system, comprising context associated with a communication session established between a first communication session participant and a second communication session participant is received. The second communication session participant is an agent of the first call center system. For example, with reference to FIG. 3, first call center system 306 provides a request 326 to call context service 316 executing on computing device 302. Request 326 is received by request receiver 312 of call context service 316. Request 326 comprises context associated with a communication session established between a first communication session participant (e.g., a user of client device 102, as described above with reference to FIG. 1) and a second communication session participant, the second communication session participant being an agent of first call center system 306. Request 326 is an example of request 126, as described above with reference to FIG. 1.

In accordance with one or more embodiments, the context comprises at least one of a name of the first communication session participant, a phone number associated with the first communication session participant, a phone number of the first call center system by which the communication session was established, an identifier of the first call center system, an application identifier that identifies an application of the first call center system associated with the phone number of the first call center system, a start time at which the communication session was initiated, an identifier of the second call center system to which the first communication session participant is to be transferred, a target application identifier that identifies an application of the second call center system to which the first communication session participant is to be transferred, information provided by the first communication session participant during the communication session, or a transcript of the communication session. For example, with reference to FIG. 3, context 322 comprises at least one of a name of the first communication session participant (e.g., a user of client device 102, as shown in FIG. 1), a phone number associated with the first communication session participant, a phone number of first call center system 306 by which the communication session was established, an identifier of first call center system 306, an application identifier that identifies an application of first call center system 306 associated with the phone number of first call center system 306, a start time at which the communication session was initiated, an identifier of second call center system 310 to which the first communication session participant is to be transferred, a target application identifier that identifies an application of second call center system 310 to which the first communication session participant is to be transferred, information provided by the first communication session participant during the communication session, or a transcript of the communication session.

In step 204, the context is stored in a data store maintained by the computing device. For example, with reference to FIG. 3, request receiver 312 of call context service 316 stores the context (shown as context 322) to data store 305. For instance, data store 305 may comprise a record of the communication session between the user and call center system 306. Request receiver 312 may store the context (e.g., context 322) within the record. The record may comprise a plurality of fields, each corresponding to one or more different types of context data described herein.

In step 206, a first response, to the first call center system, comprising a phone number of the second call center system platform to which the first communication session participant is to be transferred, is provided to the first call center system. For example, with reference to FIG. 3, target phone number determiner 314 of call context service 316 determines a phone number of second call center system 310 to which the first communication session participant is to be transferred and provides the determined target phone number (shown as target phone number 320) to response generator 318. Response generator 318 generates and provides a response 328 to first call center system 306 that comprises the target phone number. Response 328 is an example of response 128, as described above with reference to FIG. 1. Additional details regarding determining target phone number 320 are described below with reference to FIGS. 4 and 5.

In step 208, a second request, from the second call center system platform, for the context is received. For example, with reference to FIG. 3, request receiver 312 of call context service 316 executing on computing device 302 receives a request 330 for context 322 provided by second call center system 310. Request 330 is an example of request 130, as described above with reference to FIG. 1.

In accordance with one or more embodiments, the second request comprises a phone number associated with the first communication session participant and the phone number of the second call center system. For example, with reference to FIG. 3, request 330 comprises phone number associated with the first communication session participant (e.g., the phone number associated with client device 102, as shown in FIG. 1) and the phone number of second call center system 310 to which the first communication session participant was transferred.

In step 210, a second response comprising the context is provided to the second call center system. For example, with reference to FIG. 3, request receiver 312 queries data store 305 for context 322 using information included in request 330. After retrieving context 322, request receiver provides context 322 to response generator 318. Response generator generates and provides a response 332 comprising context 322 to second call center system 310.

In accordance with one or more embodiments, the context is retrieved from the data store based on the phone number associated with the first communication session participant and the phone number of the second call center system, and the retrieved context is included in the second response. For example, with reference to FIG. 3, response generator 318 may submit a query to data store 305 for context 322. The query may specify the phone number associated with the first communication session participant and the phone number of second call center system 310 to which the first communication session participant was transferred. Data store 305 may locate the record associated with such phone numbers and provide context 322 associated therewith to response generator 318. Response generator 318 includes context 322 in response 322.

Figure 4:
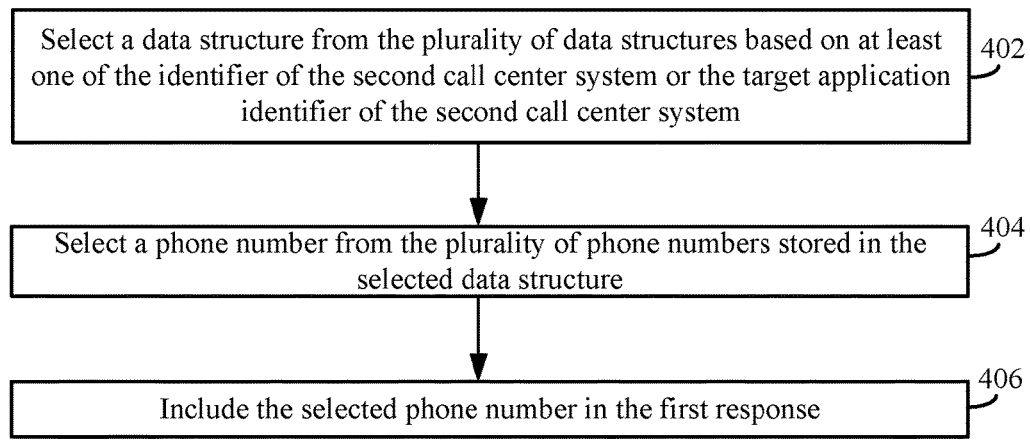
FIG. 4 shows a flowchart of a method for determining a phone number to which a communication session participant is to be transferred in accordance with an example embodiment.
Figure 5:
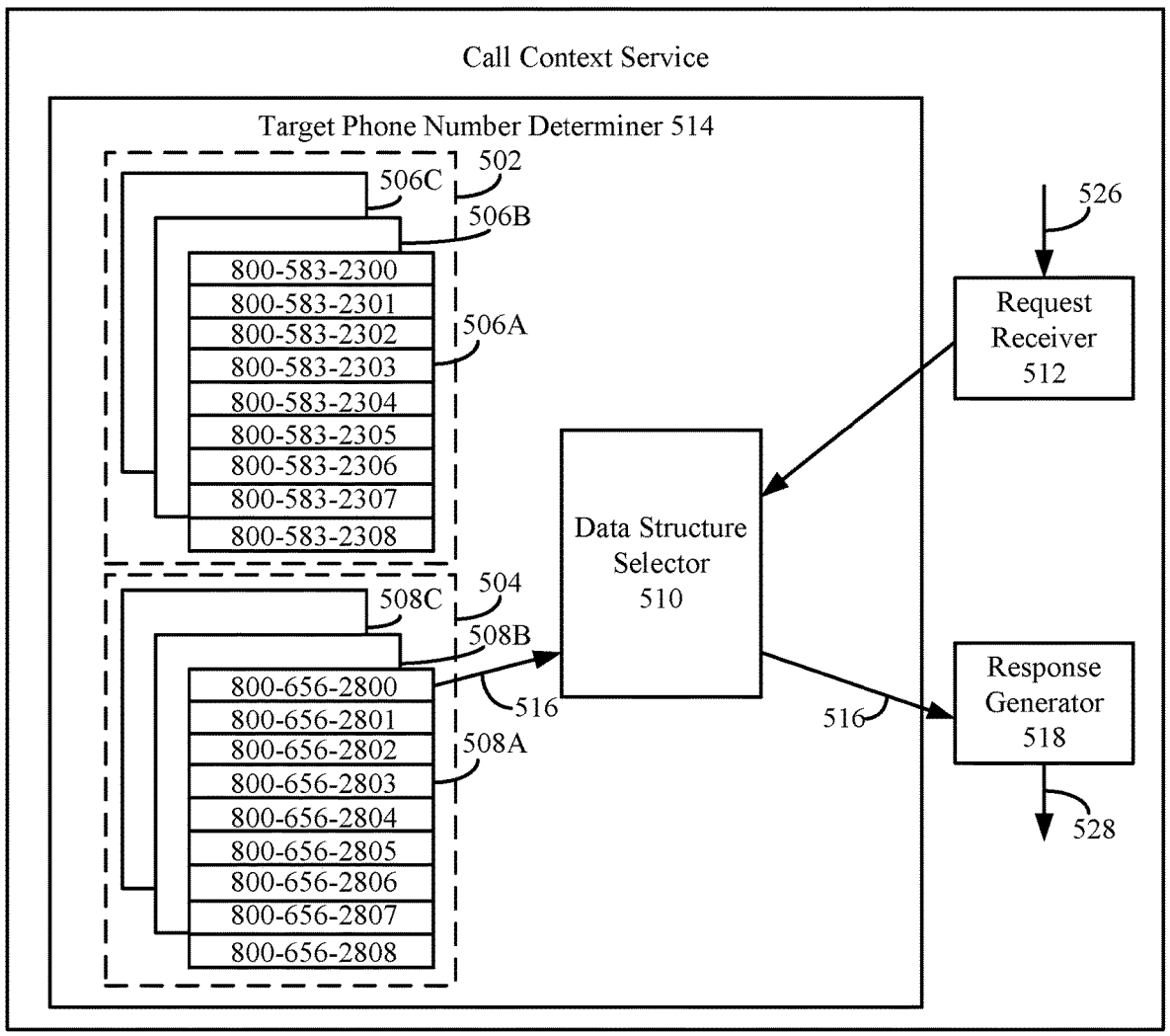
FIG. 5 depicts a block diagram of call context service in accordance with an example embodiment.

FIG. 4 shows a flowchart 400 of a method for determining a phone number to which a communication session participant is to be transferred in accordance with an example embodiment. In an embodiment, flowchart 400 may be implemented by a call context service 500 of FIG. 5. Accordingly, flowchart 400 will be described with reference to FIG. 5. FIG. 5 depicts a block diagram of call context service 500 in accordance with an example embodiment. Call context service 500 is an example of call context service 316, as described above with reference to FIG. 3. As shown in FIG. 5, call context service 500 comprises a request receiver 512, a target phone number determiner 514, and a response generator 518, which are examples of request receiver 312, target phone number determiner 314, and response generator 318, as respectively described above with reference to FIG. 3. As further shown in FIG. 5, target phone number determiner 514 comprises a first set 502 of data structures 506A-506C and a second set 504 of data structures 508A-508C. First set 502 is associated with a first call center system (e.g., first call center system 306, as shown in FIG. 3), and second set 504 is associated with a second call center system (e.g., second call center system 310, as shown in FIG. 3). Each of data structures 506A-506C is associated with a particular application of first call center system 306, and each of data structures 508A-508C is associated with a particular application of second call center system 310. Data structure 506A is configured to store a plurality of phone numbers associated with a first application of first call center system 306, data structure 506B is configured to store a plurality of phone numbers associated with a second application of first call center system 306, and data structure 506C is configured to store a plurality of phone numbers associated with a third application of first call center system 306. Similarly, data structure 508A is configured to store a plurality of phone numbers associated with a first application of second call center system 310, data structure 508B is configured to store a plurality of phone numbers associated with a second application of second call center system 310, and data structure 508C is configured to store a plurality of phone numbers associated with a third application of second call center system 310. Data structure 506A is associated with the identifier of first call center system 306 and/or the application identifier of the first application of first call center system 306. Data structure 506B is associated with the identifier of first call center system 306 and/or the application identifier of the second application of first call center system 306. Data structure 506C is associated with the identifier of first call center system 306 and/or the application identifier of the third application of first call center system 306. Data structure 508A is associated with the identifier of second call center system 310 and/or the application identifier of the first application of second call center system 310. Data structure 508B is associated with the identifier of second call center system 310 and/or the application identifier of the second application of second call center system 310. Data structure 508C is associated with the identifier of second call center system 310 and/or the application identifier of the third application of second call center system 310. Each of data structures 506A-506C and 508A-508C may be associated with other context, such as, but not limited to a language. It is noted that while FIG. 5 depicts two sets of data structures (i.e., first set 502 and second set 504), call context service 500 may maintain any number of sets for any number of call center systems. It is further noted that while FIG. 5 depicts three data structures per set and 9 phone numbers per data structure, each set may comprise any number of data structures for any number of applications of a given call center system and may comprise any number of phone numbers for a given application. Other structural and operational embodiments will be apparent to persons skilled in the relevant art(s) based on the discussion regarding flowchart 400 and call context service 500 of FIG. 5.

Flowchart 400 begins with step 402. In step 402, a data structure from the plurality of data structures is selected based on at least one of the second call center system or the target application identifier of the second call center system. For example, with reference to FIG. 5, request receiver 512 may receive a request 526 from first call center system 306, which comprises context, such as an identifier of second call center system 310 and/or a target application identifier of second call center system 310 (or other context, such as the language preference of the user). Request 526 is an example of request 326, as described above with reference to FIG. 3. Request receiver 512 may provide the identifier of second call center system 310 and/or the target application identifier to data structure selector 510 (or other call context, such as the language preference of the user). Data structure selector 510 determines which of data structure of data structures 506A-506C and 508A-508C is to be utilized for obtaining a phone number. For instance, suppose the target application identifier specifies the first application of second call center system 310, then data structure selector selects data structure 508A, as it is associated with the identifier of second call center system 310 and the application identifier of the first application of second call center system 310. In an embodiment in which the language preference of the user is also utilized, data structure selector 510 may also utilize the language preference to determine a data structure associated with the preferred language. This way, the user will be directed to an application of second call center system 310 that plays back prompts in the preferred language.

At step 404, a phone number is selected from the plurality of phone numbers stored in the selected data structure. For example, with reference to FIG. 5, data structure selector 510 may select the next available phone number from the selected data structure (e.g., data structure 508A). In accordance with an embodiment, each of data structures 506A-506C and 508A-508C represent a respective DNIS pool structured as queue. In accordance with such an embodiment, the phone number located at the front of the queue is the next available phone number. In the example shown in FIG. 5, the phone number 800-656-2800 is located at the front of the queue and therefore is selected.

At step 406, the selected phone number is included in the first response. For example, with reference to FIG. 5, data structure selector provides the selected phone number (shown as phone number 516) to response generator 518. Response generator 518 includes phone number 516 into a response 528 provided to first call center system 306. Response 528 is an example of response 328, as described above with reference to FIG. 3.

Figure 6:
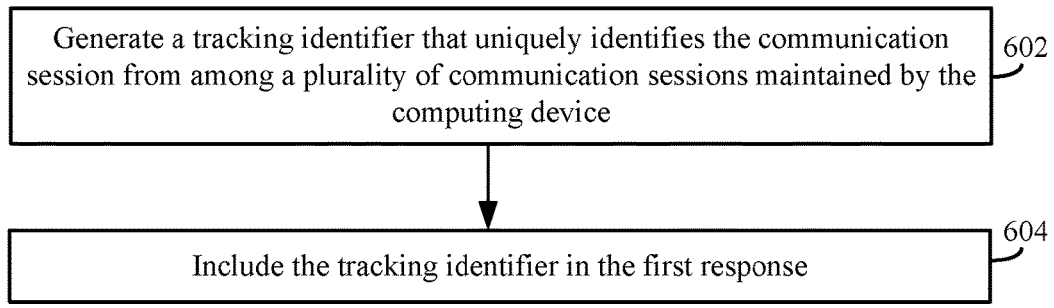
FIG. 6 shows a flowchart of a method for generating a unique tracking identifier in accordance with an example embodiment.
Figure 7:
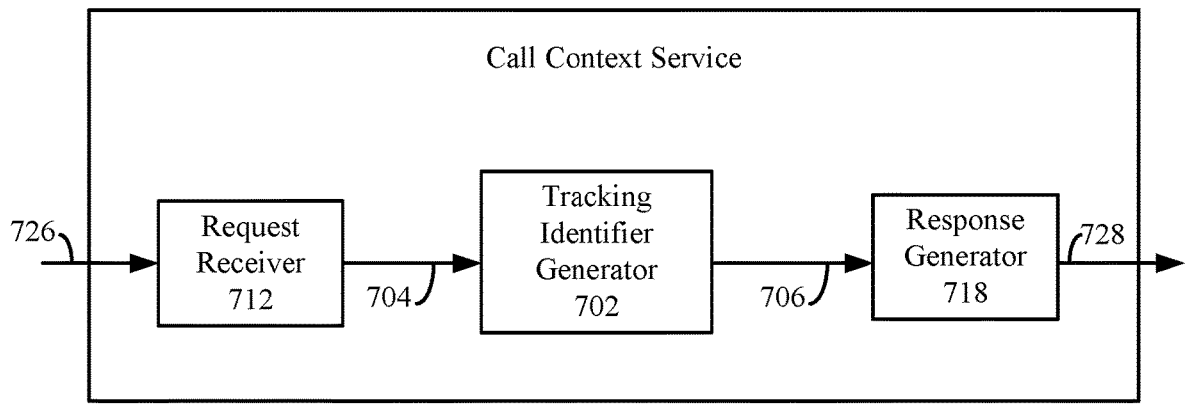
FIG. 7 depicts a block diagram of a call context service in accordance with another example embodiment.

In accordance with an embodiment, call context service 500 is also configured to generate a unique tracking identifier that uniquely identifies the communication session from a plurality of communication sessions. For instance, FIG. 6 shows a flowchart 600 of a method for generating a unique tracking identifier in accordance with an example embodiment. In an embodiment, flowchart 600 may be implemented by a call context service 700 of FIG. 7. Accordingly, flowchart 600 will be described with reference to FIG. 7. FIG. 7 depicts a block diagram of call context service 700 in accordance with an example embodiment. Call context service 700 is an example of call context service 500, as described above with reference to FIG. 5. As shown in FIG. 7, call context service 700 comprises a request receiver 712, a tracking identifier generator 702, and a response generator 718. Request receiver 712 and response generator 718 are examples of request receiver 512 and response generator 518, as respectively described above with reference to FIG. 5. Additional components described above with reference to call context service 500 are not described for call context service 700 for the sake of brevity. Other structural and operational embodiments will be apparent to persons skilled in the relevant art(s) based on the discussion regarding flowchart 600 and call context service 700 of FIG. 5.

Flowchart 600 begins with step 602. In step 602, a tracking identifier that uniquely identifies the communication session from among a plurality of communication sessions maintained by the computing device is generated. For example, with reference to FIG. 7, request receiver 712 may comprise a request 726 from first call center system 306 (as shown in FIG. 3), which comprises various context, such as the phone number associated with the first communication session participant (e.g., a user of client device 102, as shown in FIG. 1) and a phone number of the first call center system 306 (as shown in FIG. 3) by which the communication was established. Request 726 is an example of request 526, as described above with reference to FIG. 5. Such context (shown as context 704) may be provided to tracking identifier generator 702. Tracking identifier generator 702 may be configured to generate a unique tracking identifier for each unique first communication session participant phone number and first call center system 306 phone number pairing. For instance, tracking identifier generator 702 may comprise a random number generator that randomly generates a tracking identifier when a unique phone number pairing has been detected. In another example, tracking identifier generator 702 may generate a hash corresponding to the unique tracking identifier based on the unique phone number pairing. In yet a further example, tracking identifier generator 702 may increment the previously-generated tracking identifier to generate the unique tracking identifier responsive to detecting the unique phone number pairing. It is noted that tracking identifier generator 702 may utilized different criteria to determine when to generate a unique tracking identifier and/or utilize other techniques to generate the unique tracking identifier. Tracking identifier generator 702 provides the unique tracking identifier (shown as tracking identifier 706) to response generator 718.

In step 604, the tracking identifier is included in the first response. For example, with reference to FIG. 7, response generator 718 generates a response 728 comprising tracking identifier 706 and provides response 728 to first call center system 306, thereby informing first call center system 306 of tracking identifier 706 that was generated for the communication session.

In accordance with one or more embodiments, call context service 700 may include the tracking identifier in each response provided to a call center system in associated with the communication session. For example, the tracking identifier may be included in response 332 provided to call center 308, as described above with reference to FIG. 3.

III. Example Computer System Implementation

The systems and methods described above in reference to FIGS. 1-7, may be implemented in hardware, or hardware combined with one or both of software and/or firmware. For example, system 800 of FIG. 8 may be used to implement any of call context service 116, call center 104, client device 102, call center 108, first call center system 106, second call center system 110, first call center 304, second call center 308, first call center system 306, second call center system 310, data store 305, computing device 302, call context service 316, request receiver 312, target phone number determiner 314, response generator 318, call context service 500, target phone number determiner 514, request receiver 512, response generator 518, first set 502 of data structures 506A-506C, second set 504 of data structures 508A-508C, call context service 700, request receiver 712, tracking identifier generator 702, and response generator 718, and/or any of the components respectively described therein, and flowcharts 200, 400, and/or 600 may be each implemented as computer program code/instructions configured to be executed in one or more processors and stored in a computer readable storage medium. Alternatively, any of call context service 116, call center 104, client device 102, call center 108, first call center system 106, second call center system 110, first call center 304, second call center 308, first call center system 306, second call center system 310, data store 305, computing device 302, call context service 316, request receiver 312, target phone number determiner 314, response generator 318, call context service 500, target phone number determiner 514, request receiver 512, response generator 518, first set 502 of data structures 506A-506C, second set 504 of data structures 508A-508C, call context service 700, request receiver 712, tracking identifier generator 702, and response generator 718, and/or any of the components respectively described therein, and flowcharts 200, 400, and/or 600 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions. The description of system 800 provided herein is provided for purposes of illustration, and is not intended to be limiting. Embodiments may be implemented in further types of computer systems, as would be known to persons skilled in the relevant art(s).

Figure 8:
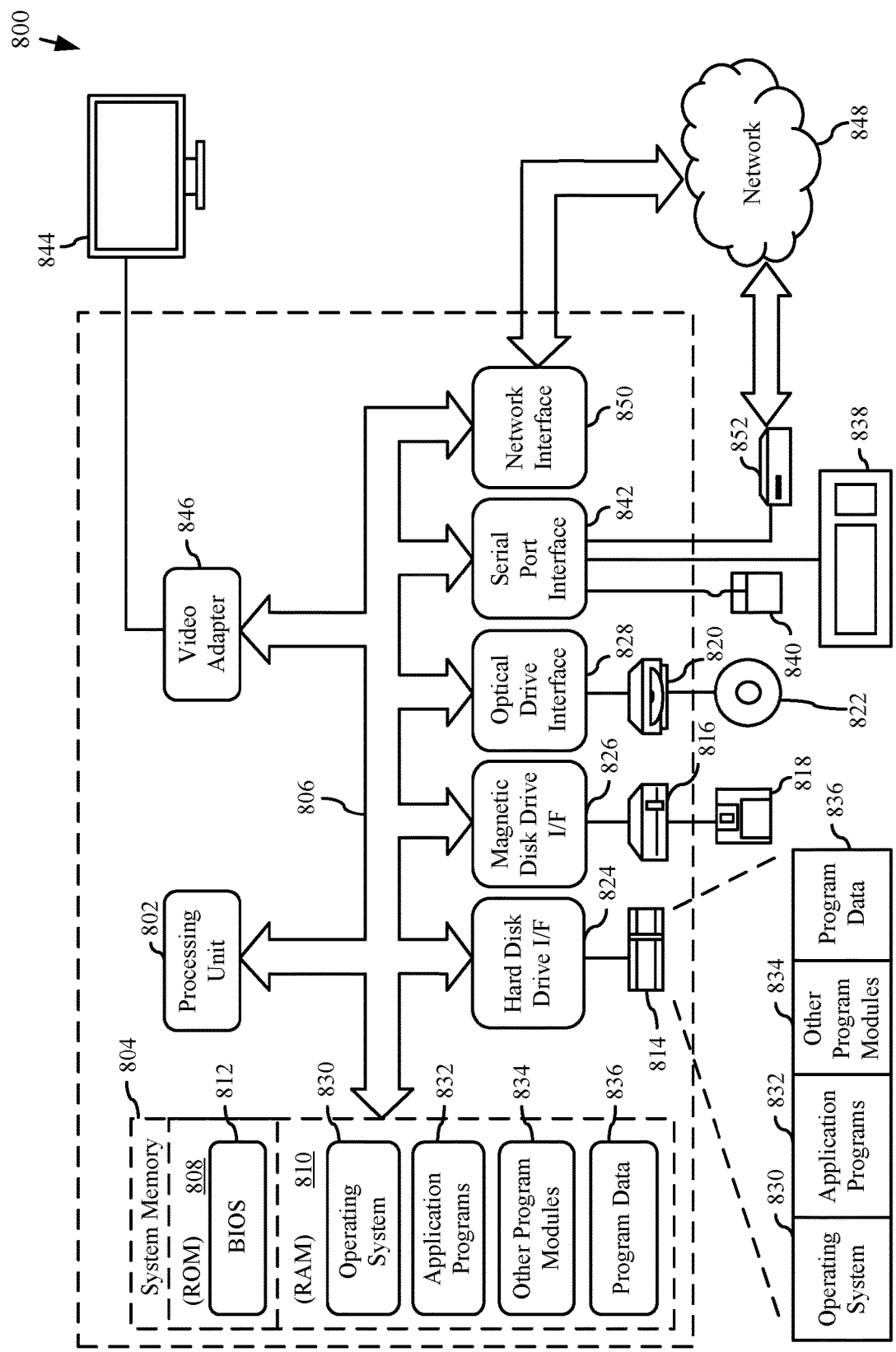
FIG. 8 is a block diagram of an example processor-based computer system that may be used to implement various embodiments.

As shown in FIG. 8, system 800 includes a processing unit 802, a system memory 804, and a bus 806 that couples various system components including system memory 804 to processing unit 802. Processing unit 802 may comprise one or more circuits, microprocessors or microprocessor cores. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

System 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, BLU-RAY™ disk or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as solid state drives, flash memory cards, digital video disks, random access memories (RAMs), read only memories (ROM), and the like.

A number of program modules may be stored on the hard disk, magnetic disk, optical disk, ROM, or RAM. These program modules include an operating system 830, one or more application programs 832, other program modules 834, and program data 836. In accordance with various embodiments, the program modules may include computer program logic that is executable by processing unit 802 to perform any or all of the functions and features of any of call context service 116, call center 104, client device 102, call center 108, first call center system 106, second call center system 110, first call center 304, second call center 308, first call center system 306, second call center system 310, data store 305, computing device 302, call context service 316, request receiver 312, target phone number determiner 314, response generator 318, call context service 500, target phone number determiner 514, request receiver 512, response generator 518, first set 502 of data structures 506A-506C, second set 504 of data structures 508A-508C, call context service 700, request receiver 712, tracking identifier generator 702, and response generator 718, and/or any of the components respectively described therein, and flowcharts 200, 400, and/or 600, and/or any of the components respectively described therein, as described above. The program modules may also include computer program logic that, when executed by processing unit 802, causes processing unit 802 to perform any of the steps of any of the flowcharts of FIGS. 2, 4, and 6, as described above.

A user may enter commands and information into system 800 through input devices such as a keyboard 838 and a pointing device 840 (e.g., a mouse). Other input devices (not shown) may include a microphone, joystick, game controller, scanner, or the like. In one embodiment, a touch screen is provided in conjunction with a display 844 to allow a user to provide user input via the application of a touch (as by a finger or stylus for example) to one or more points on the touch screen. These and other input devices are often connected to processing unit 802 through a serial port interface 842 that is coupled to bus 806, but may be connected by other interfaces, such as a parallel port, game port, or a universal serial bus (USB). Such interfaces may be wired or wireless interfaces.

Display 844 is connected to bus 806 via an interface, such as a video adapter 846. In addition to display 844, system 800 may include other peripheral output devices (not shown) such as speakers and printers.

System 800 is connected to a network 848 (e.g., a local area network or wide area network such as the Internet) through a network interface 850, a modem 852, or other suitable means for establishing communications over the network. Modem 852, which may be internal or external, is connected to bus 806 via serial port interface 842.

As used herein, the terms "computer program medium," "computer-readable medium," and "computer-readable storage medium" are used to generally refer to memory devices or storage structures such as the hard disk associated with hard disk drive 814, removable magnetic disk 818, removable optical disk 822, as well as other memory devices or storage structures such as flash memory cards, digital video disks, random access memories (RAMs), read only memories (ROM), and the like. Such computer-readable storage media are distinguished from and non-overlapping with communication media and modulated data signals (do not include communication media or modulated data signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media. Embodiments are also directed to such communication media that are separate and non-overlapping with embodiments directed to computer-readable storage media.

As noted above, computer programs and modules (including application programs 832 and other program modules 834) may be stored on the hard disk, magnetic disk, optical disk, ROM, or RAM. Such computer programs may also be received via network interface 850, serial port interface 842, or any other interface type. Such computer programs, when executed or loaded by an application, enable system 800 to implement features of embodiments discussed herein. Accordingly, such computer programs represent controllers of the system 800.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, solid state drives, floppy disks, CD ROMs, DVD ROMs, zip disks, tapes, magnetic storage devices, optical storage devices, MEMs, nanotechnology-based storage devices, and the like.

IV. Further Example Embodiments

A system comprising at least one processor circuit and at least one memory that stores program configured to be executed by the at least one processor circuit. The program code comprises a call context service configured to: receive a first request, from a first call center system communicatively coupled to the call context service, comprising context associated with a communication session established between a first communication session participant and a second communication session participant, the second communication session participant being an agent of the first call center system; store the context in a data store communicatively coupled to the call context service; provide a first response, to the first call center system, comprising a phone number of a second call center system, communicatively coupled to the call context service, to which the first communication session participant is to be transferred; receive a second request, from the second call center system, for the context; and provide a second response, to the second call center system, comprising the context.

In one implementation of the foregoing system, the context comprises at least one of: a name of the first communication session participant; a phone number associated with the first communication session participant; a phone number of the first call center system by which the communication session was established; an identifier of the first call center system; an application identifier that identifies an application of the first call center system associated with the phone number of the first call center system; a start time at which the communication session was initiated; an identifier of the second call center system to which the first communication session participant is to be transferred; a target application identifier that identifies an application of the second call center system to which the first communication session participant is to be transferred; information provided by the first communication session participant during the communication session; or a transcript of the communication session.

In another implementation of the foregoing system, the system maintains a plurality of data structures each storing a plurality of phone numbers associated with a respective application of the second call center system.

In another implementation of the foregoing system, the call context service is further configured to: select a data structure from the plurality of data structures based on at least one of the identifier of the second call center system or the target application identifier of the second call center system; select a phone number from the plurality of phone numbers stored in the selected data structure; and include the selected phone number in the first response.

In another implementation of the foregoing system, the call context service is further configured to: generate a tracking identifier that uniquely identifies the communication session from among a plurality of communication sessions maintained by the system; and include the tracking identifier in the first response.

In another implementation of the foregoing system, the call context service is further configured to: including the tracking identifier in the second response.

In another implementation of the foregoing system, the second request comprises a phone number associated with the first communication session participant and the phone number of the second call center system.

In another implementation of the foregoing system, the call context service is further configured to: retrieve the context from the data store based on the phone number associated with the first communication session participant and the phone number of the second call center system; and include the retrieved context in the second response.

A method performed by a computing device communicatively coupled to a first call center system and a second call center system is also described herein. The method includes: receiving a first request, from the first call center system, comprising context associated with a communication session established between a first communication session participant and a second communication session participant, the second communication session participant being an agent of the first call center system; storing the context in a data store maintained by the computing device; providing a first response, to the first call center system, comprising a phone number of the second call center system to which the first communication session participant is to be transferred; receiving a second request, from the second call center system, for the context; and providing a second response, to the second call center system, comprising the context.

In one implementation of the foregoing method, the context comprises at least one of: a name of the first communication session participant; a phone number associated with the first communication session participant; a phone number of the first call center system by which the communication session was established; an identifier of the first call center system; an application identifier that identifies an application of the first call center system associated with the phone number of the first call center system; a start time at which the communication session was initiated; an identifier of the second call center system to which the first communication session participant is to be transferred; a target application identifier that identifies an application of the second call center system to which the first communication session participant is to be transferred; information provided by the first communication session participant during the communication session; or a transcript of the communication session.

In another implementation of the foregoing method, the computing device maintains a plurality of data structures each storing a plurality of phone numbers associated with a respective application of the second call center system.

In another implementation of the foregoing method, providing the first response comprises: selecting a data structure from the plurality of data structures based on at least one of the identifier of the second call center system or the target application identifier of the second call center system; selecting a phone number from the plurality of phone numbers stored in the selected data structure; and including the selected phone number in the first response.

In another implementation of the foregoing method, providing the first response further comprises: generating a tracking identifier that uniquely identifies the communication session from among a plurality of communication sessions maintained by the system; and including the tracking identifier in the first response.

In another implementation of the foregoing method, providing the second response comprises: including the tracking identifier in the second response.

In another implementation of the foregoing method, the second request comprises a phone number associated with the first communication session participant and the phone number of the second call center system.

In another implementation of the foregoing method, providing the second response comprises: retrieving the context from the data store based on the phone number associated with the first communication session participant and the phone number of the second call center system.

A computer-readable storage medium having program instructions recorded thereon that, when executed by at least one processor, perform a method implemented by a call context service communicatively coupled to a first call center system and a second call center system, perform a method. The method includes: receiving a first request, from the first call center system, comprising context associated with a communication session established between a first communication session participant and a second communication session participant, the second communication session participant being an agent of the first call center system; storing the context in a data store maintained by the call context service; providing a first response, to the first call center system, comprising a phone number of the second call center system to which the first communication session participant is to be transferred; receiving a second request, from the second call center system, for the context; and providing a second response, to the second call center system, comprising the context.

In another implementation of the foregoing computer-readable storage medium, the context comprises at least one of: a name of the first communication session participant; a phone number associated with the first communication session participant; a phone number of the first call center system by which the communication session was established; an identifier of the first call center system; an application identifier that identifies an application of the first call center system associated with the phone number of the first call center system; a start time at which the communication session was initiated; an identifier of the second call center system to which the first communication session participant is to be transferred; a target application identifier that identifies an application of the second call center system to which the first communication session participant is to be transferred; information provided by the first communication session participant during the communication session; or a transcript of the communication session.

In another implementation of the foregoing computer-readable storage medium, the call center service maintains a plurality of data structures each storing a plurality of phone numbers associated with a respective application of the second call center system.

In another implementation of the foregoing computer-readable storage medium, providing the first response comprises: selecting a data structure from the plurality of data structures based on at least one of the identifier of the second call center system or the target application identifier of the second call center system; selecting a phone number from the plurality of phone numbers stored in the selected data structure; and including the selected phone number in the first response.

V. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A system, comprising:
 a processor circuit; and
 a memory device that stores program code structured to cause the processor circuit to:
  receive a first request from a first application executing on a first computing device, the first request comprising context associated with a first communication session established between a first communication session participant and a second communication session participant, the first request received on behalf of the second communication session participant;
  responsive to the receipt of the first request, store the context included in the first request in a data store maintained by the system;

determine an application identifier of a second application executing on a second computing device to which the second communication session participant is to be transferred;
provide a first response to the first application, the first response comprising the application identifier;
receive a second request from the second application, the second request comprising a request for the context; and
provide a second response to the second application, the second response comprising the context.

2. The system of claim 1, wherein the first communication session comprises:
a website inquiry;
a live chat session;
an e-mail communication session;
a social media communication session; or
a phone call session.

3. The system of claim 1, wherein the program code is further structured to cause the processor circuit to:
generate a tracking identifier that uniquely identifies the first communication session from among a plurality of communication sessions maintained by the system; and
include the tracking identifier in the first response.

4. The system of claim 3, wherein the tracking identifier comprises:
a randomly generated tracking identifier; or
a hash corresponding to the tracking identifier.

5. The system of claim 3, wherein the second response further comprises the tracking identifier.

6. The system of claim 3, wherein:
the second request comprises the tracking identifier; and
the program code is further structured to cause the processor circuit to:
increment the tracking identifier, the incremented tracking identifier uniquely identifying a second communication session between the second communication participant and a third communication participant, and
include the incremented tracking identifier in the second response.

7. The system of claim 3, wherein:
the second request comprises the tracking identifier; and
wherein the program code is further structured to cause the processor circuit to:
retrieve the context based on the tracking identifier.

8. The system of claim 1, wherein the first application comprises a feature for managing a web site inquiry, a live chat session, an e-mail, a social media, or a phone call.

9. A method performed by a third computing device, comprising:
receiving a first request from a first application executing on a first computing device, the first request comprising context associated with a first communication session established between a first communication session participant and a second communication session participant, the first request received on behalf of the first communication session participant;
responsive to receiving the first request, storing the context included in the first request in a data store maintained by the third computing device;
determine an application identifier of a second application executing on a second computing device to which the second communication session participant is to be transferred;
providing a first response to the first application, the first response comprising the application identifier;
receiving a second request from the second application, the second request comprising a request for the context; and
providing a second response to the second application, the second response comprising the context.

10. The method of claim 9, wherein the first communication session comprises:
a website inquiry;
a live chat session;
an e-mail communication session;
a social media communication session; or
a phone call session.

11. The method of claim 9, further comprising:
generating a tracking identifier that uniquely identifies the first communication session from among a plurality of communication sessions; and
including the tracking identifier in the first response.

12. The method of claim 11, wherein said generating the tracking identifier comprises:
detecting the first communication session is a unique pairing between the first communication participant and the second communication participant; and
responsive to said detecting, randomly generating the tracking identifier.

13. The method of claim 11, wherein said generating the tracking identifier comprises:
detecting the first communication session is a unique pairing between the first communication participant and the second communication participant; and
responsive to said detecting, generating the tracking identifier as a hash based on the first communication session.

14. The method of claim 11, wherein the second response further comprises the tracking identifier.

15. The method of claim 11, wherein:
the second request comprises the tracking identifier; and
the method further comprises:
incrementing the tracking identifier, the incremented tracking identifier uniquely identifying a second communication session between the second communication participant and a third communication participant, and
including the incremented tracking identifier in the second response.

16. The method of claim 11, wherein:
the second request comprises the tracking identifier; and
the method further comprises:
retrieving the context based on the tracking identifier.

17. A computer-readable storage medium encoded with program instructions that, when executed by a processor circuit, performs a method comprising:
receiving a first request from a first application executing on a first computing device, the first request comprising context associated with a first communication session established between a first communication session participant and a second communication session participant, the first request received on behalf of the first communication session participant;
responsive to receiving the first request, storing the context included in the first request in a data store maintained by the system;
determining an application identifier of a second application executing on a second computing device to which the second communication session participant is to be transferred;
providing a first response to the first application, the first response comprising the application identifier;

receiving a second request from the second application, the second request comprising a request for the context; and providing a second response to the second application, the second response comprising the context.

18. The computer-readable storage medium of claim 17, wherein the first communication session comprises:
   a website inquiry;
   a live chat session;
   an e-mail communication session;
   a social media communication session; or
   a phone call session.

19. The computer-readable storage medium of claim 17, wherein the method further comprises:
   generating a tracking identifier that uniquely identifies the first communication session from among a plurality of communication sessions; and
   including the tracking identifier in the first response.

20. The computer-readable storage medium of claim 19, wherein:
   the second request comprises the tracking identifier; and
   the method further comprises:
      retrieving the context based on the tracking identifier.

* * * * *